(12) United States Patent
Yang et al.

(10) Patent No.: US 8,896,569 B2
(45) Date of Patent: Nov. 25, 2014

(54) ELECTROSTATIC CAPACITY TYPE TOUCH SCREEN PANEL

(75) Inventors: Jongahn Yang, Gycongbuk (KR); Sanghuck Park, Busan (KR)

(73) Assignee: LG Display Co., Ltd., Seoul (KR)

( * ) Notice: Subject to any disclaimer, the term of this patent is extended or adjusted under 35 U.S.C. 154(b) by 294 days.

(21) Appl. No.: 13/337,532

(22) Filed: Dec. 27, 2011

(65) Prior Publication Data

US 2013/0050137 A1 Feb. 28, 2013

(30) Foreign Application Priority Data

Aug. 23, 2011 (KR) ........................ 10-2011-0083942

(51) Int. Cl.
*G06F 3/045* (2006.01)
*G06F 3/044* (2006.01)

(52) U.S. Cl.
CPC ...... *G06F 3/044* (2013.01); *G06F 2203/04111* (2013.01)
USPC .......................................... 345/174; 345/173

(58) Field of Classification Search
USPC ....................................................... 345/174
See application file for complete search history.

(56) References Cited

U.S. PATENT DOCUMENTS

| | | | |
|---|---|---|---|
| 2009/0244021 A1* | 10/2009 | Matsuo et al. | 345/173 |
| 2009/0322702 A1* | 12/2009 | Chien et al. | 345/174 |
| 2010/0026661 A1* | 2/2010 | Teramoto | 345/174 |
| 2010/0053115 A1* | 3/2010 | Kim et al. | 345/174 |
| 2010/0238133 A1* | 9/2010 | Wu et al. | 345/174 |
| 2012/0044191 A1* | 2/2012 | Shin | 345/174 |

\* cited by examiner

*Primary Examiner* — Gerald Johnson
(74) *Attorney, Agent, or Firm* — Morgan, Lewis & Bockius LLP

(57) ABSTRACT

A touch screen panel is disclosed. The touch screen panel includes a substrate; a plurality of first electrode serials arranged on the substrate; a plurality of second electrode serials arranged to cross over the first electrode serials; and an insulation layer formed at the intersections of the first and second electrode serials and to electrically insulate the first and second electrode serials, wherein each of the first electrode serials comprises a plurality of first electrode patterns and second connection patterns for connecting neighboring first electrode patterns, each of the second electrode serials comprises a plurality of second electrode patterns and first connection patterns for connecting neighboring second electrode patterns, and each of the first electrode patterns comprises a lower layer formed on the substrate and an upper layer formed on the lower layer, and the second connection pattern connects neighboring first electrode pattern upper layers.

16 Claims, 13 Drawing Sheets

ELECTROSTATIC CAPACITY TYPE TOUCH SCREEN PANEL

This application claims the benefit of Korea Patent Application No. 10-2011-083942 filed on Aug. 23, 2011, the entire contents of which is incorporated herein by reference for all purposes as if fully set forth herein.

BACKGROUND

1. Field

This document relates to an electrostatic capacity type touch screen panel.

2. Related Art

In recent years, display devices such as a liquid crystal display, an electroluminescent display, and a plasma display panel having a quick response speed, low power consumption, and an excellent color reproduction rate, have been in the spotlight. The display device has been used for various electronic products such as a television, a monitor for a computer, a notebook computer, a mobile phone, a display unit of a refrigerator, a personal digital assistant, and an automated teller machine. In general, the display device interfaces with various input devices such as a keyboard, a mouse, and a digitizer. However, when a separate input device such as a keyboard, a mouse, etc. is used, a user is required to know how to use the separate input device and since the separate input device occupies space, use of the display device is inconvenient, making it difficult to increase the completeness of the product. Therefore, a request for a convenient and simple input device that can reduce an erroneous operation gradually increases. According to such a request a touch screen panel in which a user can input information by directly contacting with a screen by a finger or a pen is suggested.

Because the touch screen panel has a simple configuration while occurring little or no erroneous operations, can perform an input action without a separate input device, and has convenience in which the user can quickly and easily manipulate through contents displayed on a screen, the touch screen panel is applied to various display devices.

Touch screen panels are classified into a resistive type, a capacitive type, an electromagnetic type and so on according to a detection method of a touched portion. The resistive type touch screen panel determines a touched position by a voltage gradient according to resistance in a state that a DC voltage is applied to metal electrodes formed on an upper plate or a low plate. The capacitive type touch screen panel forms an equipotential with a conductive film and senses a touched position according to a difference in capacitance created in an upper or lower plate when the user touches the conductive film formed on the upper or lower plate. The electromagnetic type touch screen panel detects a touched portion by reading an LC value induced as an electromagnetic pen touches a conductive film.

Hereinafter, an electrostatic capacity type touch screen panel according to the related art will be described with reference to FIGS. 1 and 2. FIG. 1 is a plan view illustrating an electrostatic capacity type touch screen panel according to the related art, and FIG. 2 is a cross-sectional view taken along line I-I', line II-II', and line III-III' of the touch screen panel of FIG. 1.

Referring to FIGS. 1 and 2, the related art electrostatic capacity type touch screen panel comprises an electrode forming part A, a routing wire part B, and a pad part C.

The electrode forming part A is formed on a substrate 10 and comprises a plurality of first electrode serials Tx arranged in parallel in a first direction (for example, an X-axis direction) and a plurality of second electrode serials Rx arranged to intersect in a direction (for example, an Y-axis direction) perpendicular to the first electrode serials Tx. The first electrode serials Tx and the second electrode serials Rx cross over each other to sustain an electrical insulation state by an insulation layer 40. Each of the first electrode serials Tx comprises a plurality of first electrode patterns 50, and neighboring first electrode patterns 50 are connected to each other by a connection pattern 30. The connection pattern 30 is connected to the neighboring first electrode patterns 50 exposed through the insulation layer 40. Each of the second electrode serials Rx comprise a plurality of second electrode patterns 52 that are formed integral with each other.

The routing wire part B is formed outside the electrode forming part A, and comprises a plurality of first routing wires 22 connected to the plurality of first electrode serials Tx, respectively, and a plurality of second routing wires 24 connected to the plurality of second electrode serials Rx, respectively.

The pad part C comprises a plurality of first pads 26 connected to the plurality of first electrode serials Tx through the plurality of first routing wires 22, respectively, and a plurality of second pads 28 connected to the plurality of second electrodes 22 through the plurality of second routing wires 24, respectively.

Hereinafter, a method of manufacturing a related art electrostatic capacity type touch screen panel will be described with reference to FIGS. 3a to 6b. FIGS. 3a and 3b are cross-sectional views showing a first mask process of the touch screen panel of FIG. 1. FIGS. 4a and 4b are cross-sectional views showing a second mask process of the touch screen panel of FIG. 1. FIGS. 5a and 5b are cross-sectional views showing a third mask process of the touch screen panel of FIG. 1. FIGS. 6a and 6b are cross-sectional views showing a fourth mask process of the touch screen panel of FIG. 1.

Referring to FIGS. 3a and 3b, a first conductive layer is deposited on the entire substrate 10 comprising an electrode forming part A, a routing wire part B, and a pad part C through a deposition process such as a sputtering method. As the first conductive layer, a metal such as copper is generally used. After a photoresist is coated on the entire substrate 10 on which the first conductive layer is formed, and a first photoresist pattern for exposing the first conductive layer is formed in the routing wire part B and the pad part C by performing a photolithography process using a first mask. After removing the first conductive layer exposed by the first photoresist pattern through wet etching, lower layers 22a and 24a of the first and second routing wires are formed on the routing wiring part B, and lower layers 26a and 28a of the first and second pads are formed on the pad part C.

Referring to FIGS. 4a and 4b, a second conductive layer is deposited on the entire surface of the substrate 10 comprising the lower layers 22a and 24a of the first and second routing wires and the lower layers 36a and 26b of the first and second pad parts through a deposition process such as a sputtering method. As the second conductive layer, an indium tin oxide (ITO) layer is generally used. After a photoresist is coated on the entire substrate on which the second conductive layer is formed, a second photoresist pattern for exposing the second conductive layer is formed by performing a photolithography process using a second mask. After removing the first conductive layer exposed by the second photoresist pattern through wet etching, a plurality of connection patterns 30 arranged in parallel in a first direction (an X-axis direction) and separated from each other at a predetermined interval are formed on the electrode forming part A of the substrate 10, upper layers 22b and 24b of the first and second routing wires are formed on the routing wire part B respectively, and upper layers 26b and 28b of the first and second pads are formed on the pad part C respectively.

Referring to FIGS. 5a and 5b, after an insulation layer is formed on the substrate 10 in which the plurality of connection patterns 30, the upper layers 22b and 24b of the first and second routing wires, and the upper layers 26b and 28b of the first and second pad parts, first insulation patterns 40 are formed by patterning the insulation layer so as to expose both ends of each connection pattern 30 formed in the electrode forming part A by a photolithography process and an etching process using a third mask, and a second insulation pattern 42 is formed in the routing wire part B and the pad part C by patterning the insulation layer so as to expose the upper layers 26b and 28b of the first and second pad parts formed in the pad part C. The insulation layer comprises silicon nitride, silicon oxide, or organic resin.

Referring to FIGS. 6a and 6b, a third conductive layer is formed on the entire surface of the substrate where the first and second insulation patterns 40 and 42 are formed by a deposition process such as a sputtering method. As the third conductive layer, ITO may be used. After a photoresist is coated on the entire substrate on which the third conductive layer is formed, first electrode patterns 50 formed in parallel in a first direction (for example, an X-axis direction) and a plurality of second electrode patterns formed in parallel in a second direction (for example, an Y-axis direction) crossing over the first direction are formed in the electrode forming part A of the substrate 10 by performing a photolithography process and an etching process using a fourth mask, and uppermost layers 26c and 28c of the first and second pads are formed in the pad part C of the substrate 10. Each of the first electrode patterns 50 is formed so as to cover the ends of the connection pattern 30 exposed to the outside of the first insulation pattern 40. Thus, the neighboring first electrode patterns 50 are connected to each other by the connection pattern 30, thus forming a first electrode line Tx longitudinally extending in the first direction. Meanwhile, the second electrode patterns 52 are formed integral with each other so as to extend longitudinally in the second direction, thus forming a second electrode line Rx.

However, in the electrostatic capacity type touch screen panel according to the related art, for example, manufacturing processes are performed at a relatively low temperature (about 150° C.). Thus, the first electrode pattern 50 and the second electrode pattern 52 need to be kept thick in order to satisfy the surface resistance condition of the first electrode pattern 50 and second electrode pattern 52 that are touched. In this way, if the thickness of the first electrode pattern 50 and second electrode pattern 52 increases, the sputtering time for forming an ITO layer increases in order to form the first electrode pattern 50 and the second electrode pattern 52, and the etching time also increases. Therefore, the process yield is lowered. Especially, if the thickness of the ITO layer is too large, the residual film remains at the time of etching, thus making pattern formation impossible.

SUMMARY

An aspect of this document is to provide a touch screen panel, which can reduce the sputtering time and etching time of a transparent conductive layer for forming electrodes used as touch electrodes and enables patterning without leaving any residual film, and a method for manufacturing the same.

Additional features and advantages of the invention will be set forth in the description which follows, and in part will be apparent from the description, or may be learned by practice of the invention. The objectives and other advantages of this invention will be realized and attained by the structure particularly pointed out in the written description and claims hereof as well as the appended drawings.

To achieve these and other advantages and in accordance with the purpose of this invention, as embodied and broadly described, a touch screen panel includes a substrate; a plurality of first electrode serials arranged in a first direction on the substrate; a plurality of second electrode serials arranged in a second direction to cross over the first electrode serials; and an insulation layer formed at the intersections of the first and second electrode serials and to electrically insulate the first and second electrode serials, wherein each of the first electrode serials comprises a plurality of first electrode patterns and second connection patterns for connecting neighboring first electrode patterns, each of the second electrode serials comprises a plurality of second electrode patterns and first connection patterns for connecting neighboring second electrode patterns, and each of the first electrode patterns comprises a lower layer formed on the substrate and an upper layer formed on the lower layer, and the second connection pattern connects neighboring first electrode pattern upper layers.

In the touch screen panel, each of the second electrode patterns comprises a lower layer formed on the substrate and an upper layer formed on the lower layer of the second electrode pattern, and the first connection pattern connects neighboring second electrode pattern lower layers.

In the touch screen panel, the first electrode pattern upper layers are integrally formed with the second connection patterns, and the second electrode pattern lower layers are integrally formed with the first connection patterns.

In the touch screen panel, the second connection patterns and the first connection patterns are formed to cross over each other with the insulation layer interposed therebetween, and the first connection pattern is formed under the insulation layer, and the second connection pattern is formed on the insulation layer.

The touch screen panel further includes a plurality of first routing wires connected respectively to the plurality of first electrode serials; and a plurality of second routing wires connected respectively to the plurality of second electrode serials, each of the first routing wires comprises a lower layer formed on the substrate and an upper layer formed on the lower layer of the first routing wire and connected to the lower layer of the first electrode pattern, and each of the second routing wires comprises a lower layer formed on the substrate and an upper layer formed on the lower layer of the second routing wire and connected to the lower layer of the first electrode pattern.

The touch screen panel further includes a plurality of first pads connected respectively to the plurality of first routing wires; and a plurality of second pads connected respectively to the plurality of second routing wires, wherein each of the first pads comprises a first layer formed on the substrate and connected to the lower layer of the first routing wire, a second layer formed on the first layer and connected to the upper layer of the first routing wire, and a third layer formed on the second layer, and each of the second pads comprises a first layer formed on the substrate and connected to the lower layer of the second routing wire, a second layer formed on the first layer and connected to the upper layer of the second routing wire, and a third layer formed on the second layer of the second pad.

In the touch screen panel, the first and second electrode serials, the upper layers of the first and second routing wires, the second layers of the first and second pads, and the third layers of the first and second pads are formed of a transparent conductive material, and the lower layers of the first and second routing wires and the first layers of the first and second pads are made of any metal selected from Al, AlNd, Mo, MoTi, Cu, CuOx, and Cr.

In the touch screen panel, the thickness of the upper layer of the first electrode pattern is greater than the thickness of the lower layer of the first electrode pattern, and the thickness of the upper layer of the second electrode pattern is greater than the thickness of the lower layer of the second electrode pattern.

To achieve these and other advantages and in accordance with the purpose of this invention, as embodied and broadly described, a method for manufacturing a touch screen panel includes preparing a substrate comprising an electrode forming area and a routing wire forming area positioned outside the electrode forming area; forming a first conductive pattern group comprising lower layers of first routing wires and lower layers of second routing wires in the routing wire forming area; forming a second conductive pattern group comprising lower layers of first electrode pattern groups, lower layers of second electrode patterns groups, and first connection patterns for connecting neighboring second electrode pattern lower layers in the electrode forming area of the substrate in which the first conductive pattern group is formed; forming first insulation patterns on top of the first connection patterns of the electrode forming area and forming a second insulation pattern in the lower layers of the first routing wires and the lower layers of the second routing wires; and forming first electrode pattern upper layers on the first electrode pattern lower layers, forming second connection patterns on the first insulation patterns, and forming second electrode pattern upper layers on the second electrode pattern lower layers.

In the method, the forming of the first conductive pattern group includes depositing a first conductive layer on the entire surface of the substrate; forming a first photoresist pattern so as to expose the first conductive layer of the entire electrode forming area and the first conductive layer of some part of the routing wire forming area; and forming the lower layers of the first routing wires and the lower layers of the second routing wires in the routing wire forming area by wet-etching the exposed first conductive layer and removing the first photoresist pattern, and the forming of the second conductive pattern group includes depositing a second conductive layer on the entire surface of the substrate in which the first conductive pattern group is formed; forming a second photoresist pattern so as to expose the second conductive layer of some part of the electrode forming area of the substrate and the second conductive layer of some part of the routing wire forming area; and forming first preliminary electrode serials arranged in a first direction and second preliminary electrode serials arranged in a second direction crossing over the first direction in the electrode forming area by wet-etching the second conductive layer exposed by the second photoresist pattern and removing the second photoresist pattern, and forming upper layers in the routing wire forming area so as to cover the lower layers of the first and second routing wires.

In the method, each of the first preliminary electrode serials comprises a plurality of first electrode pattern lower layers separated from each other at a predetermined interval, each of the second preliminary electrode serials comprises a plurality of second electrode pattern lower layers and first connection patterns for connecting neighboring second electrode pattern lower layers, and the second electrode pattern lower layers are integrally formed with the first connection patterns.

In the method, the forming of the first and second insulation patterns includes forming an insulation layer on the substrate in which the second conductive pattern group is formed; forming a third photoresist pattern so as to expose the insulation layer of some part of the electrode forming area of the substrate; and forming first insulation patterns formed on the first connection patterns of the electrode forming area and second insulation patterns on the first and second routing wires of the routing wire forming area by dry-etching the insulation layer exposed by the third photoresist pattern and removing the third photoresist pattern.

In the method, the forming of the third conductive pattern group includes depositing a third conductive layer on the entire surface of the substrate in which the first and second insulation patterns are formed; forming a fourth photoresist pattern so as to expose part of the third conductive layer of the electrode forming area of the substrate; forming first and second electrode pattern upper layers, respectively, on the first and second electrode pattern lower layers by removing the third conductive layer exposed by the fourth photoresist pattern through wet etching and removing the fourth photoresist pattern, and forming second connection patterns on the first insulation patterns.

In the method, the second connection patterns connects neighboring first electrode patterns, and the first electrode pattern upper layers are integrally formed with the second connection patterns.

In the method, the first and second electrode serials and the upper layers of the first and second routing wires are formed of a transparent conductive material, and the lower layers of the first and second routing wires are formed of any metal selected from Al, AlNd, Mo, MoTi, Cu, CuOx, and Cr.

In the method, the thickness of the upper layer of the first electrode pattern is greater than the thickness of the lower layer of the first electrode pattern, and the thickness of the upper layer of the second electrode pattern is greater than the thickness of the lower layer of the second electrode pattern.

BRIEF DESCRIPTION OF THE DRAWINGS

The accompany drawings, which are included to provide a further understanding of the invention and are incorporated on and constitute a part of this specification illustrate embodiments of the invention and together with the description serve to explain the principles of the invention. In the drawings.

DETAILED DESCRIPTION

Figure 1:
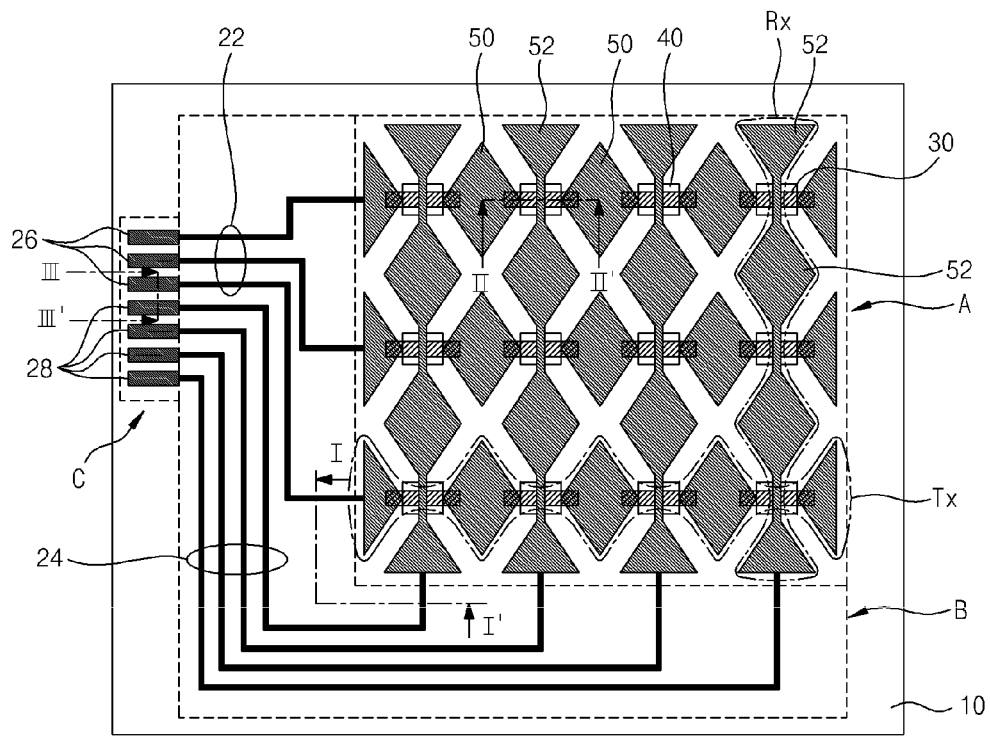
FIG. 1 is a plan view illustrating an electrostatic capacity type touch screen panel according to the related art.
Figure 1:
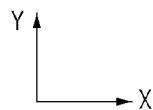
Figure 2:
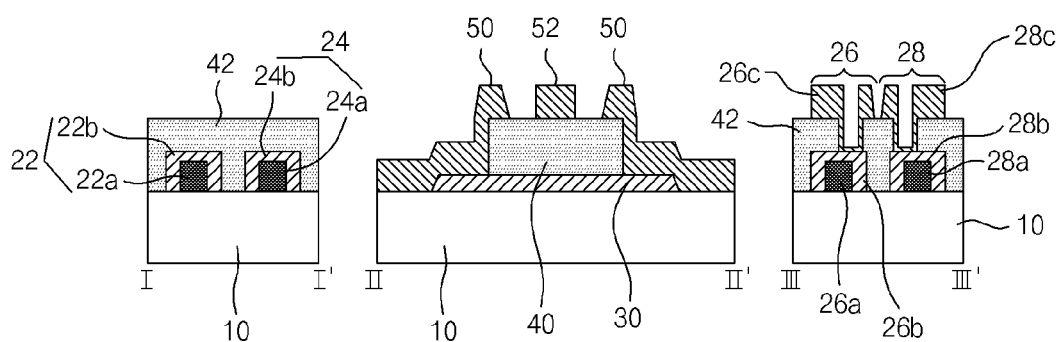
FIG. 2 is a cross-sectional view taken along line I-I', line II-II', and line III-III' of the touch screen panel of FIG. 1.
Figure 3A:
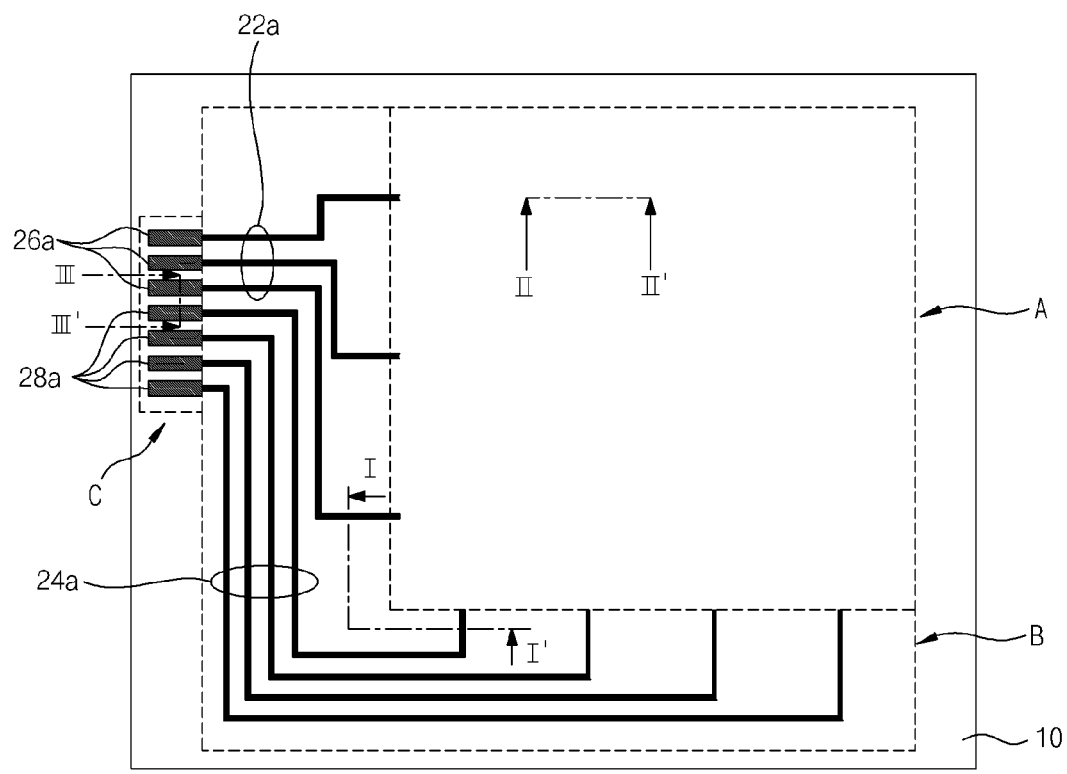
FIGS. 3A and 3B are cross-sectional views illustrating a first mask process of the touch screen panel of FIG. 1.
Figure 3B:
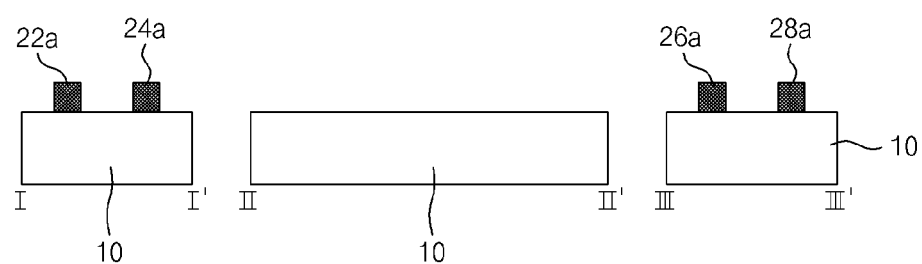
Figure 4A:
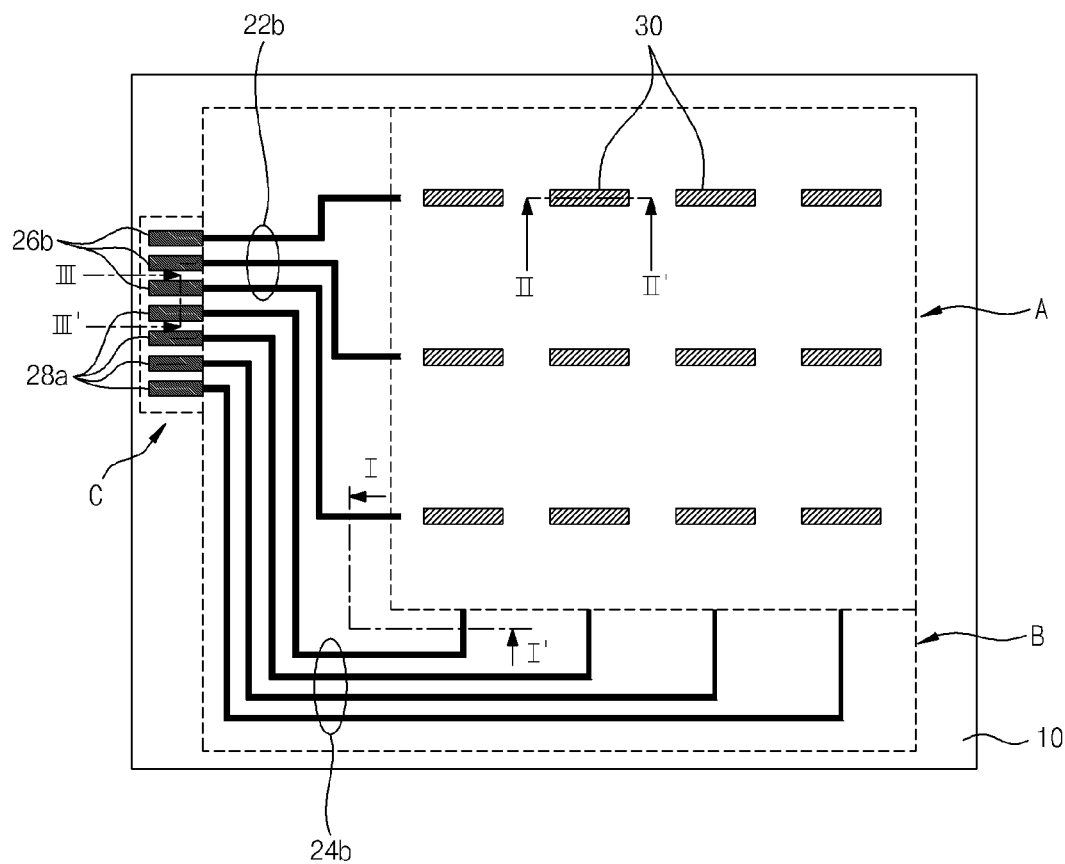
FIGS. 4A and 4B are cross-sectional views illustrating a second mask process of the touch screen panel of FIG. 1.
Figure 4B:
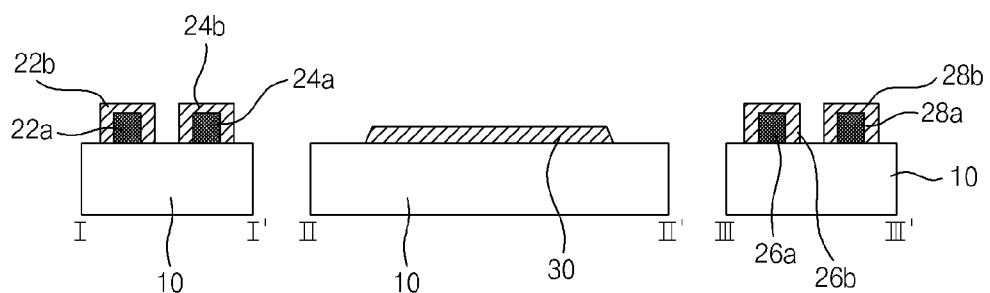
Figure 5A:
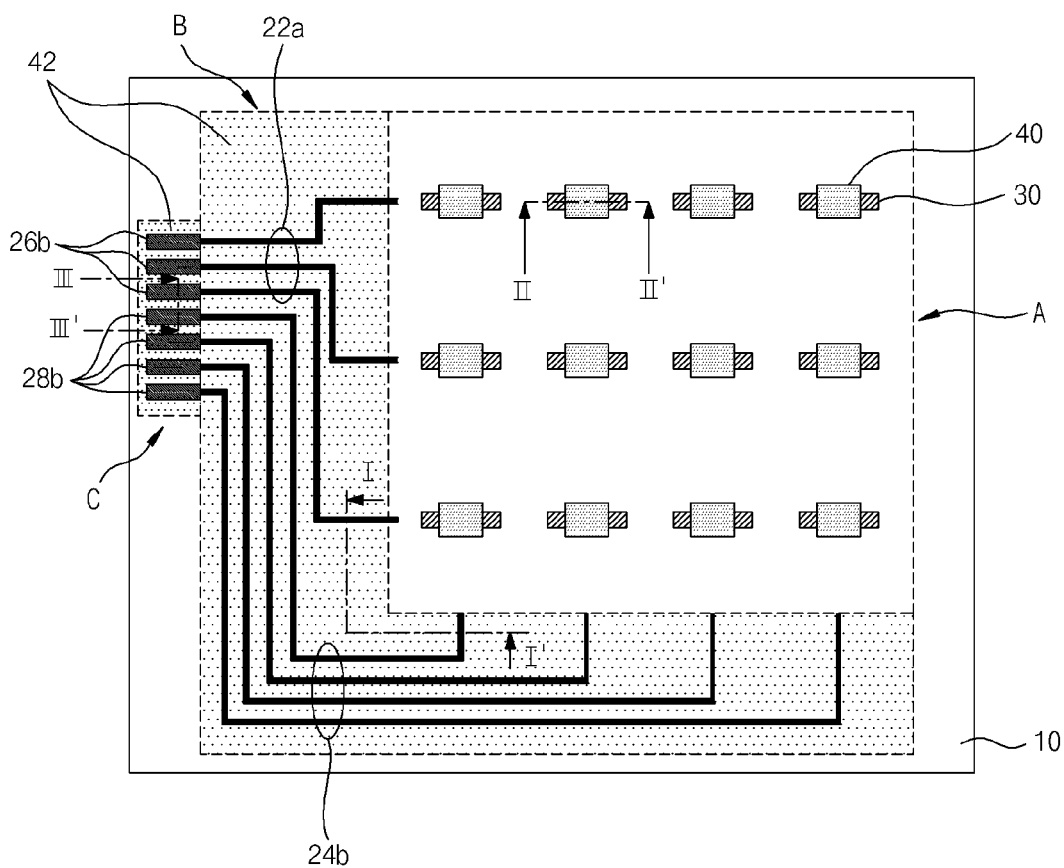
FIGS. 5A and 5B are cross-sectional views illustrating a third mask process of the touch screen panel of FIG. 1.
Figure 5B:
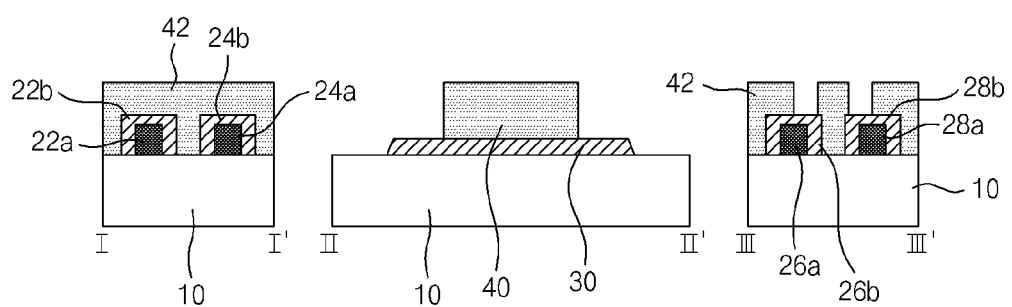
Figure 6A:
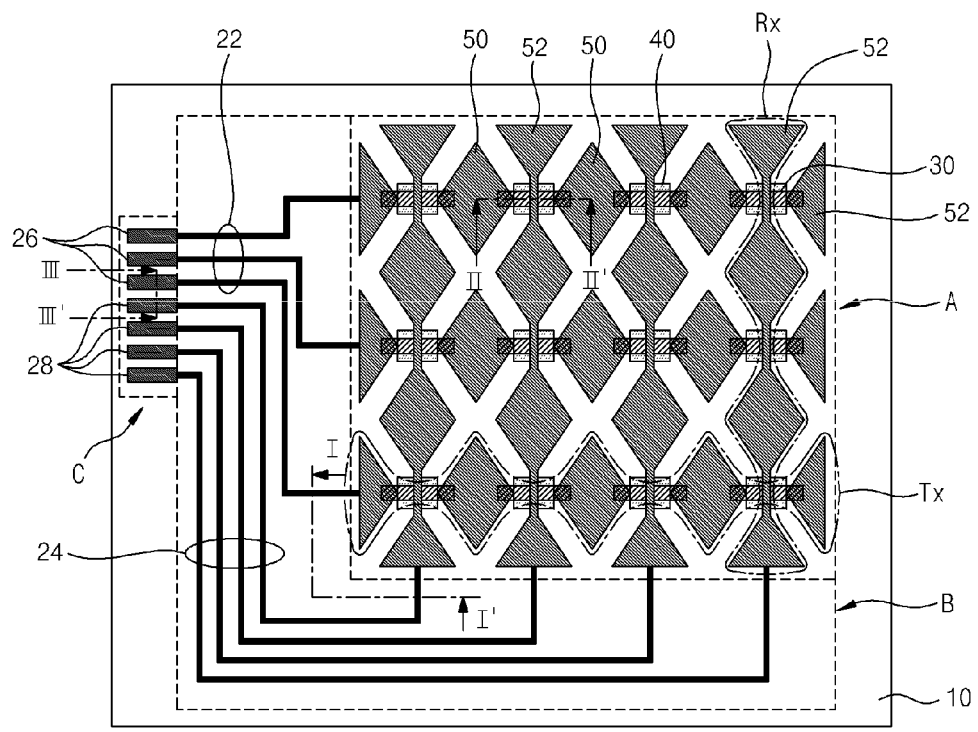
FIGS. 6A and 6B are cross-sectional views illustrating a fourth mask process of the touch screen panel of FIG. 1.
Figure 6A:
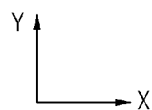
Figure 6B:
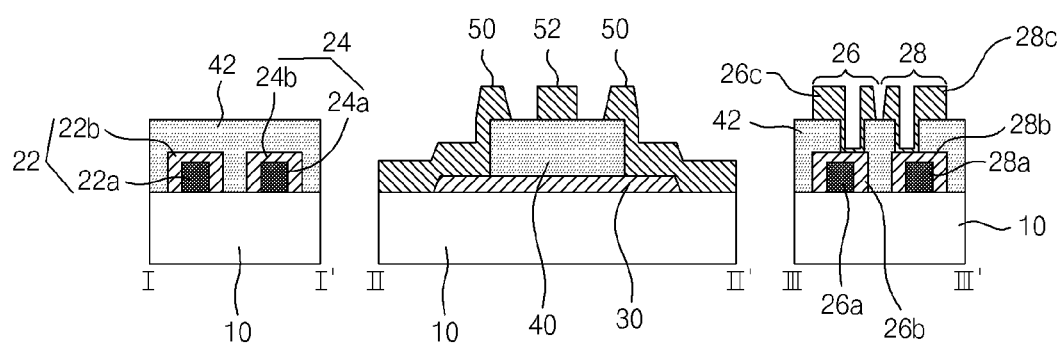

The present invention will be described more fully hereinafter with reference to the accompanying drawings, in which exemplary embodiments of the invention are shown. Like reference numerals designate like elements throughout the specification.

Figure 7:
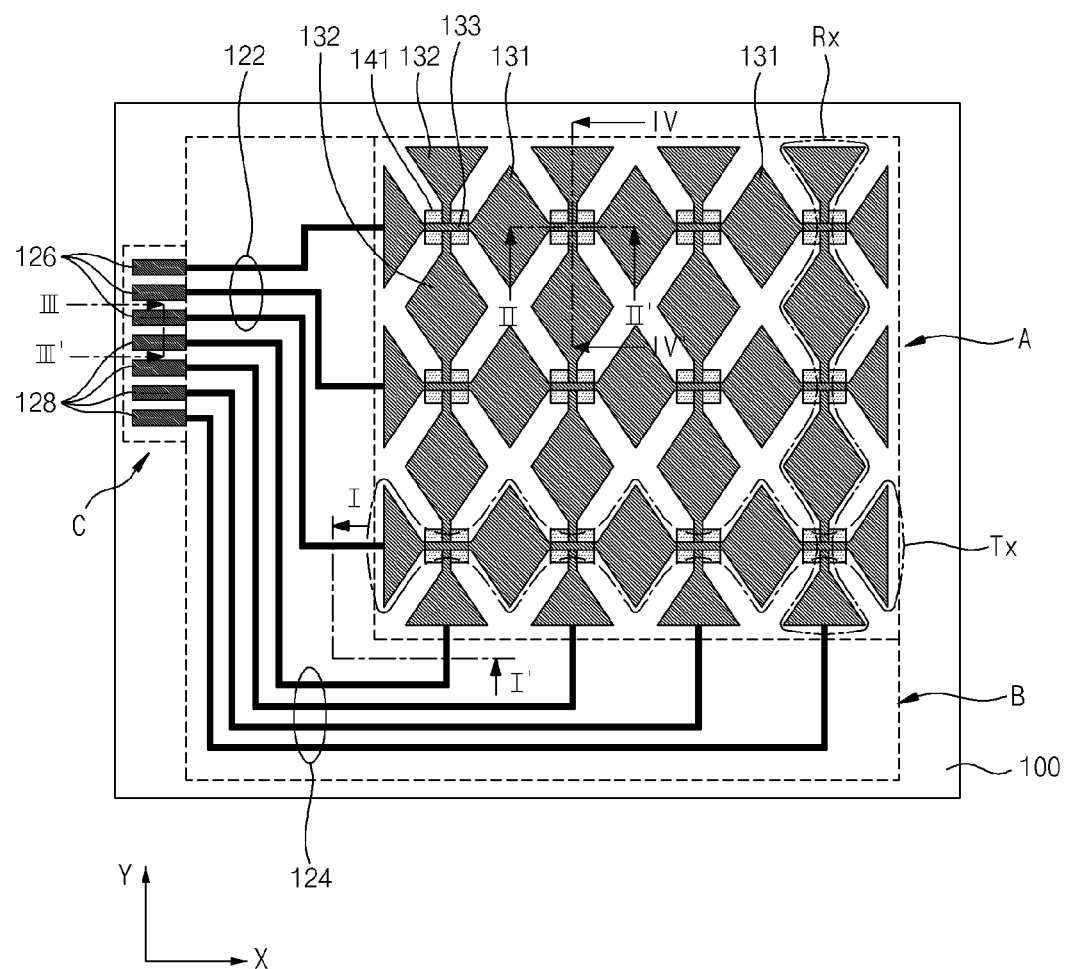
FIG. 7 is a plan view of the touch screen panel according to an exemplary embodiment of the present invention.
Figure 8:
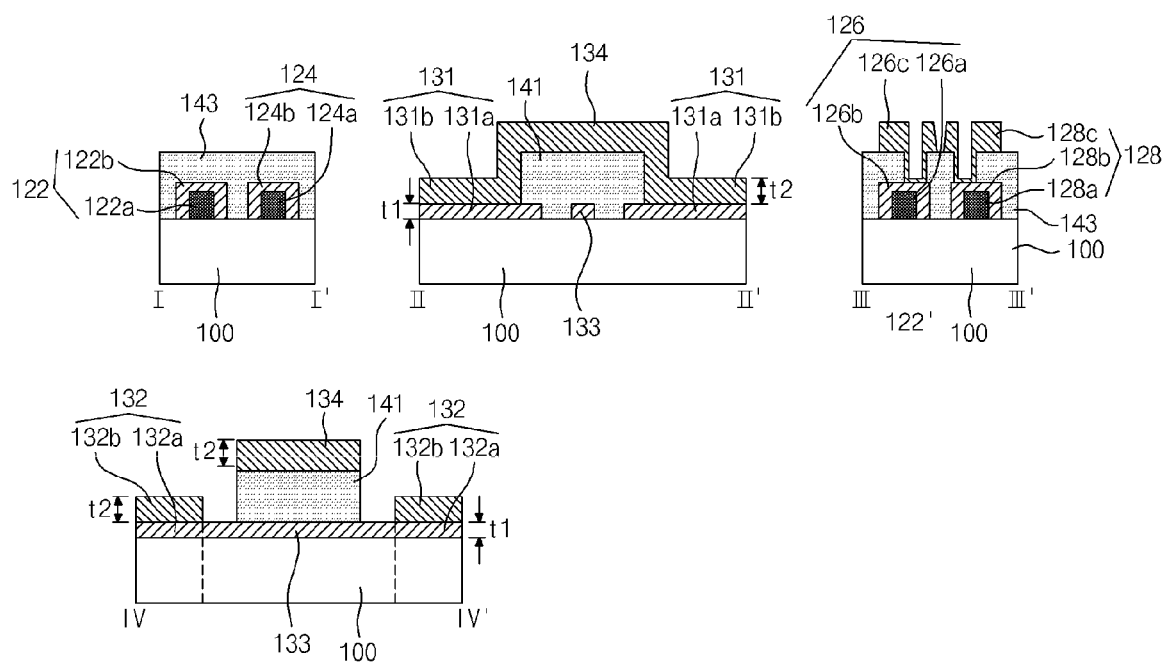
FIG. 8 is a cross-sectional view taken along line I-I', line II-II', line III-III', and line IV-IV' of the touch screen panel according to an exemplary embodiment of the present invention shown in FIG. 7.

First, a touch screen panel according to an exemplary embodiment of the present invention will be described with reference to FIGS. 7 and 8. FIG. 7 is a plan view of the touch screen panel according to an exemplary embodiment of the present invention. FIG. 8 is a cross-sectional view taken along line I-I', line II-II', line III-III', and line IV-IV' of the touch screen panel according to an exemplary embodiment of the present invention shown in FIG. 7.

Referring to FIGS. 7 and 8, an electrostatic capacity type touch screen panel according to an exemplary embodiment of the present invention comprises an electrode forming part A, a routing wire part B, and a pad part C.

The electrode forming part A comprises a plurality of first electrode serials Tx arranged in parallel in a first direction (for example, an X-axis direction) and a plurality of second electrode serials Rx arranged in a second direction (for example, an Y-axis direction) to cross over the first electrode serials Tx.

Each of the first electrode serials Tx comprises first electrode patterns 131 having a triangular shape, a quadrangular shape, a diamond shape, a polygonal shape, a circular shape, an elliptical shape, and so on and second connection patterns 134 for connecting neighboring first electrode patterns 131. The first electrode pattern 131 comprises a lower layer 131a formed on the substrate 100 and an upper layer 131b formed on the lower layer 131a. The thickness t2 of the first electrode pattern upper layer 131b is greater than the thickness t1 of the first electrode pattern lower layer 131a. The second connection pattern 134 connects neighboring first electrode pattern upper layers 131b. The first electrode pattern upper layers 131b are integrally formed with the second connection patterns 134.

Each of the second electrode serials Rx comprises second electrode patterns 132 having a triangular shape, a quadrangular shape, a diamond shape, a polygonal shape, and so on, similar to the first electrode patterns 131, and first connection patterns 133 for connecting neighboring second electrode patterns 132. The second electrode pattern 132 comprises a lower layer 132a formed on the substrate 100 and an upper layer 132b formed on the lower layer 132a. The thickness t2 of the second electrode pattern upper layer 132b is greater than the thickness t1 of the second electrode pattern lower layer 132a. The first connection pattern 133 connects neighboring first electrode pattern lower layers 132a. The second electrode pattern lower layers 132a are integrally formed with the first connection patterns 133.

The second connection pattern 134 of the first electrode serials Tx and the first connection pattern 133 of the second electrode serials Rx are formed to cross over each other with the first insulation pattern 141 interposed therebetween, and the first connection pattern 133 is formed under the first insulation pattern 141, and the second connection pattern 134 is formed on the first insulation pattern 141.

The routing wire part B is formed outside the electrode forming part A and comprises a plurality of first routing wires 122 connected to the plurality of first electrode serials Tx, respectively, and a plurality of second routing wires 124 connected to the plurality of second electrode serials Rx, respectively. The first routing wire 122 comprises a lower layer 122a formed on the substrate 100 and an upper layer 122b formed on the lower layer 122a. The second routing wire 124 comprises a lower layer 124a formed on the substrate 100 and an upper layer 124b formed on the lower layer 124a. However, the present invention is not limited thereto, the first and second routing wires 122 and 124 may be formed only of the first and second routing wire lower layers 122a and 124a without the first and second routing wire upper layers 122b and 124b.

The pad part C comprises a plurality of first pads 126 connected to the plurality of first electrode serials Tx through the plurality of first routing wires 122, respectively, and a plurality of second pads 128 connected to the plurality of second electrode serials Rx through the plurality of second routing wires 124, respectively. The first pad 126 comprises a lower layer 126a formed on the substrate 100, an upper layer 126b formed on the lower layer 126a, and an uppermost layer 126c formed on the upper layer 126b exposed through the second insulation pattern 143. The second pad 128 comprises a lower layer 128a formed on the substrate 100, an upper layer 128b formed on the lower layer 128a, and an uppermost layer 128c formed on the upper layer 128b exposed through the second insulation pattern 143. However, the present invention is not limited thereto, the first routing wires 122 may be formed only of the first and second pad lower layers 126a and 128a without the first and second pad upper layers 126b and 128b and the uppermost layers 126c and 128c.

Meanwhile, in the touch screen panel according to an exemplary embodiment of the present invention, the first and second electrode serials Tx and Rx, the first and second routing wire upper layers 122b and 124b, and the first and second pad upper layers 126b and 128b are made of a transparent conductive material, such as ITO (Indium Tin Oxide), IZO (Indium Zinc Oxide), and GZO (Gallium-doped Zinc Oxide), and the first and second routing wire lower layers 122a and 124a and the first and second pad lower layers 126a and 128a are formed of a metal material such as Al, AlNd, Mo, MoTi, Cu, CuOx, and Cr.

Figure 9A:
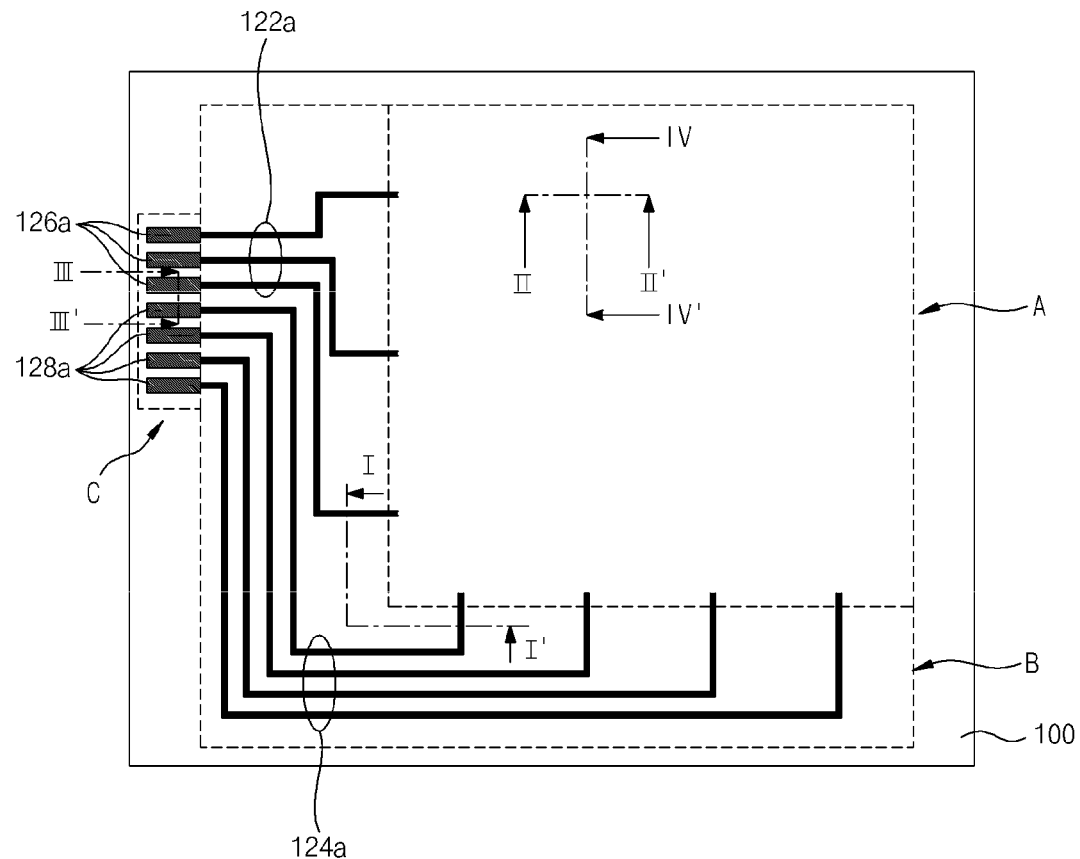
FIGS. 9A and 9B are cross-sectional views illustrating a first mask process of the touch screen panel according to an exemplary embodiment of the present invention shown in FIG. 7.
Figure 9B:
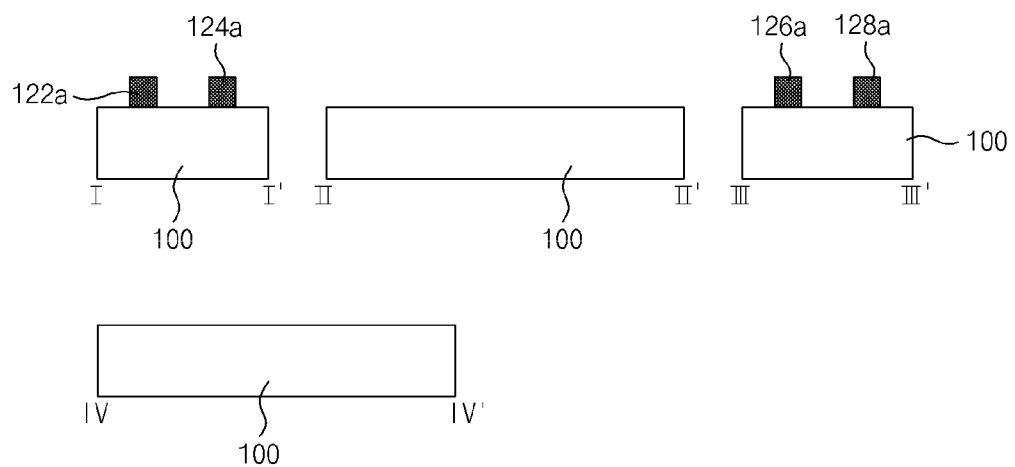
Figure 10A:
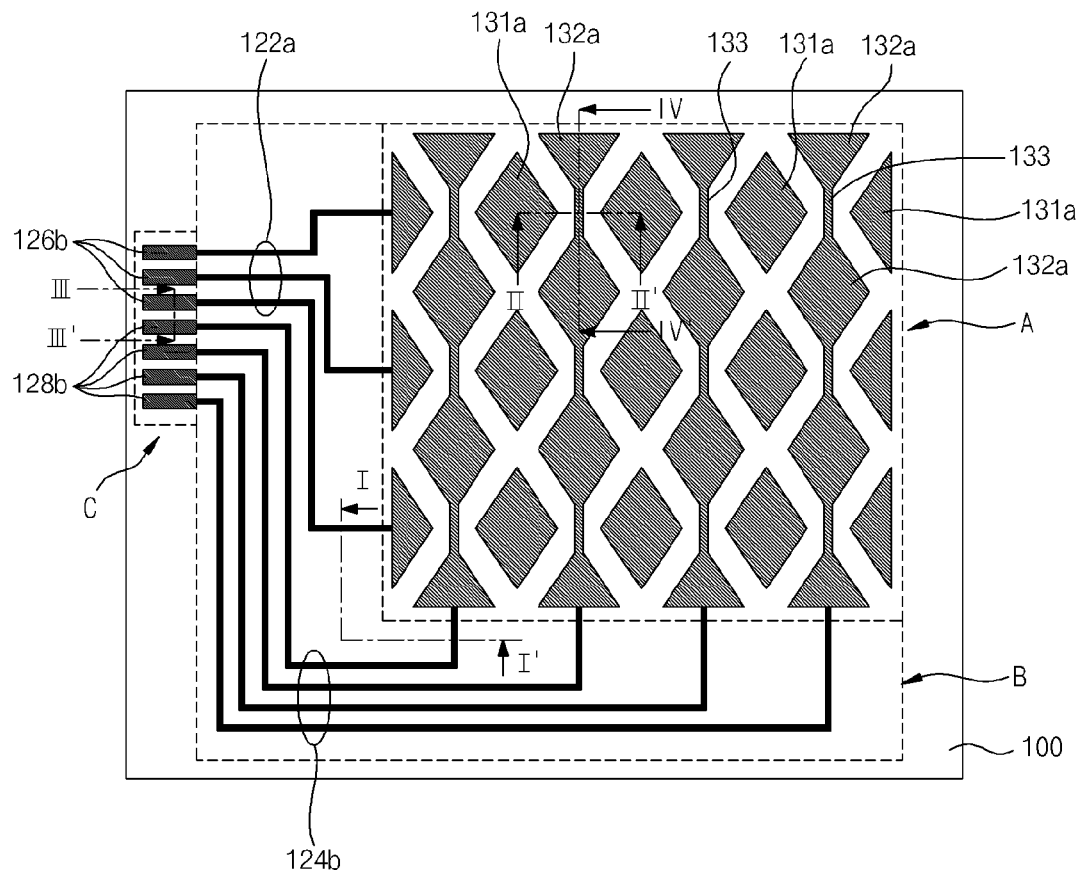
FIGS. 10A and 10B are cross-sectional views illustrating a second mask process of the touch screen panel according to an exemplary embodiment of the present invention shown in FIG. 7.
Figure 10B:
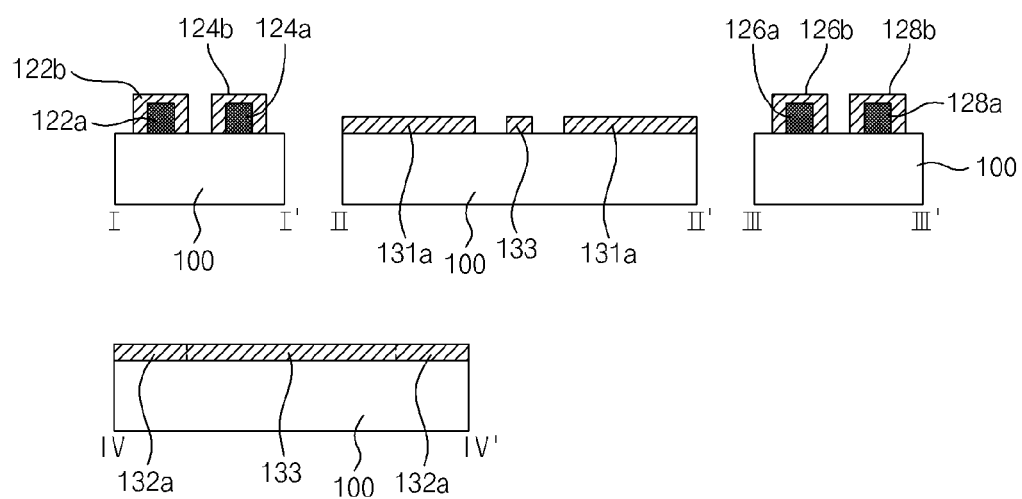
Figure 11A:
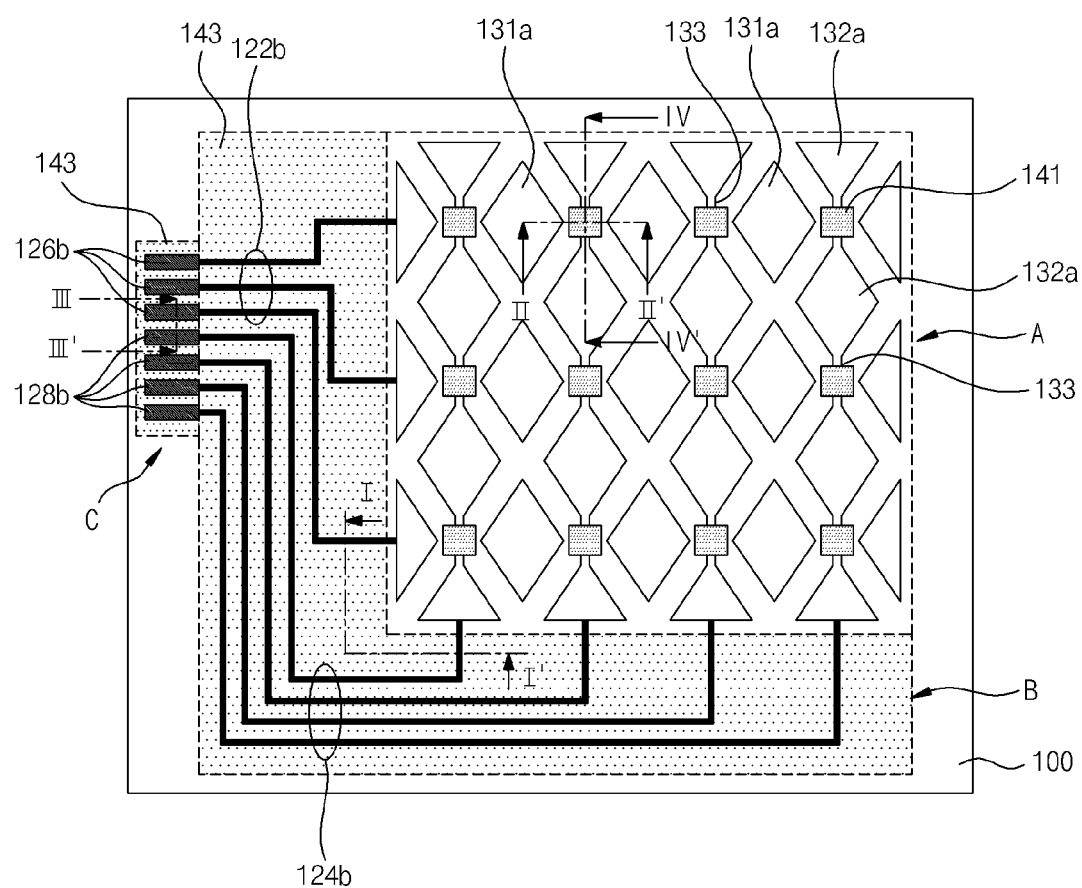
FIGS. 11A and 11B are cross-sectional views illustrating a third mask process of the touch screen panel according to an exemplary embodiment of the present invention shown in FIG. 7.
Figure 11B:
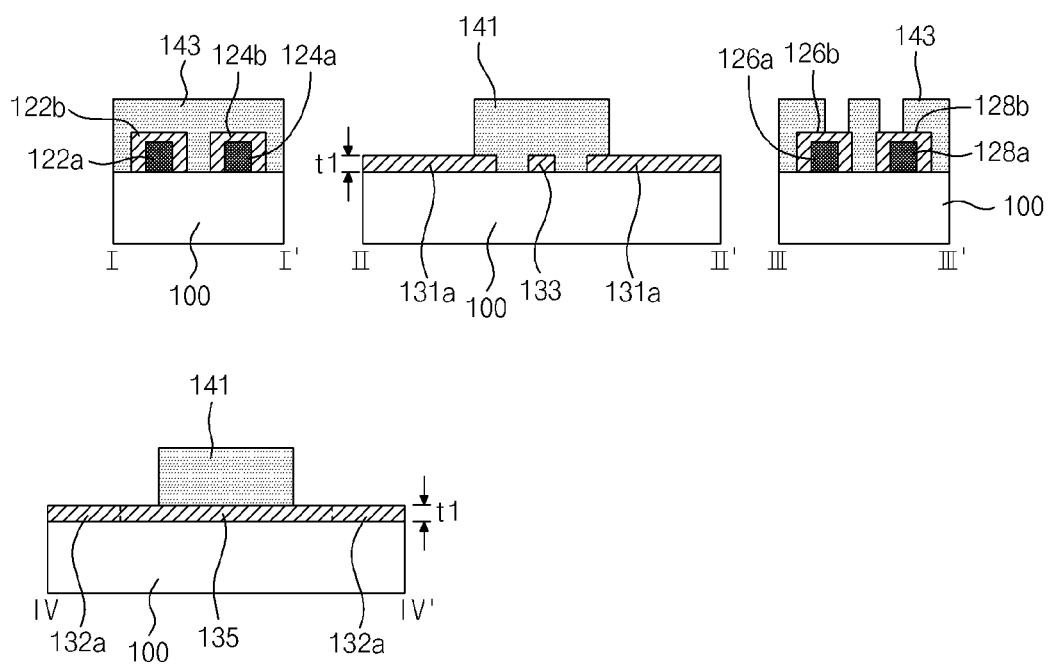
Figure 12A:
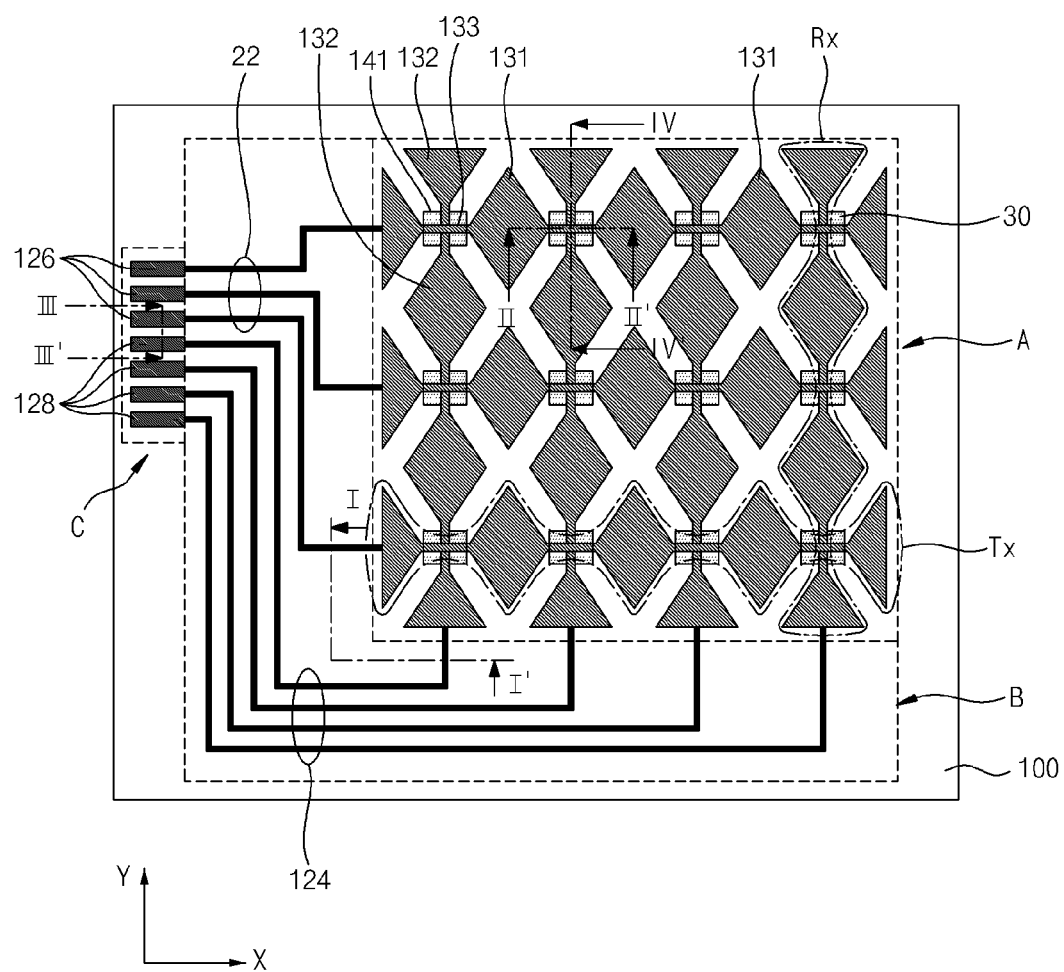
FIGS. 12A and 12B are cross-sectional views illustrating a fourth mask process of the touch screen panel according to an exemplary embodiment of the present invention shown in FIG. 7.
Figure 12B:
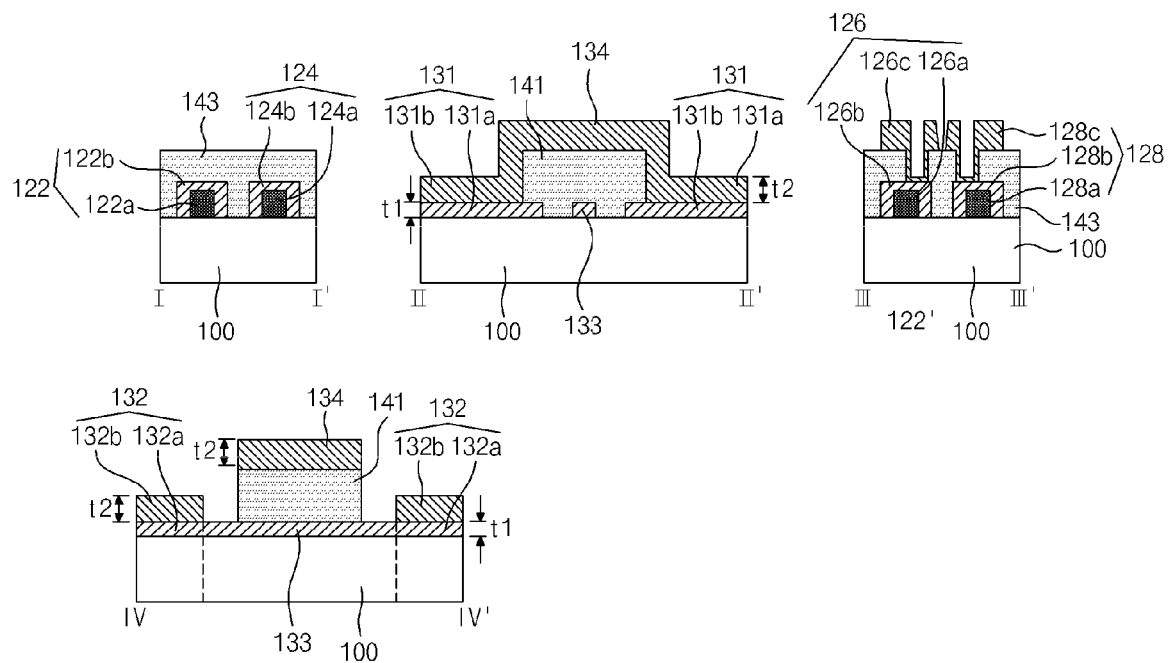

Hereinafter, referring to FIGS. 9A to 12B, a method for manufacturing an electrostatic capacity type touch screen panel according to an exemplary embodiment of the present invention will be described. FIGS. 9A and 9B are cross-sectional views illustrating a first mask process of the touch screen panel according to an exemplary embodiment of the present invention shown in FIG. 7. FIGS. 10A and 10B are cross-sectional views illustrating a second mask process of the touch screen panel according to an exemplary embodiment of the present invention shown in FIG. 7. FIGS. 11A and 11B are cross-sectional views illustrating a third mask process of the touch screen panel according to an exemplary embodiment of the present invention shown in FIG. 7. FIGS. 12A and 12B are cross-sectional views illustrating a fourth mask process of the touch screen panel according to an exemplary embodiment of the present invention shown in FIG. 7.

Referring to FIGS. 9A and 9B, a first conductive pattern group comprising the lower layers 122a of the first routing wires, the lower layers 124a of the second routing wires, the lower layers 126a of the first pads, and the lower layers 128a of the second pads is formed on the substrate 100 by using a photolithography process using the first mask.

More specifically, a first conductive layer is deposited on the entire surface of the substrate 100 comprising the electrode forming part A, the routing wire part B, and the pad part C by a deposition process such as a sputtering method. As the material for forming the first conductive layer, Al, AlNd, Mo, MoTi, Cu, CuOx, Cr, etc. is used.

After a photoresist is coated on an entire surface of the substrate 100 in which the first conductive layer is formed, a first photoresist pattern is formed to expose the first conductive layer in entire area the electrode forming part A and in some area of the routing wire part B and pad part C by performing a photolithography process using a first mask. After removing the first conductive layer exposed by the first photoresist pattern through wet etching, lower layers 122a and 124a of the first and second routing wires are formed in the routing wire part B, and lower layers 126a and 128a of the first and second pads are formed in the pad part C.

Referring to FIGS. 10A and 10B, a second conductive pattern group comprising first electrode pattern lower layers 131a, second electrode pattern lower layers 132a, and first connection patterns 133 is formed on the substrate 100 in which the first conductive pattern group is formed by a photolithography process using the second mask.

More specifically, a second conductive layer is deposited on the entire surface of the substrate in which the first conductive pattern group is formed comprising the lower layers 122a and 124a of the first and second routing wires and the lower layers 126a and 128a of the first and second pad parts by a deposition process such as a sputtering method. As the second conductive layer, a transparent metal conductive material, such as ITO (Indium Tin Oxide), IZO (Indium Zinc Oxide), and GZO (Gallium-doped Zinc Oxide), is used.

After a photoresist is coated on the substrate 10 in which the second conductive layer is formed, a second photoresist pattern for exposing a portion of the second conducive layer is formed by performing a photolithography process using a second mask. After removing the second conductive layer exposed by the second photoresist pattern through wet etching, first preliminary electrode serials Tx' arranged in parallel in a first direction (for example, an X-axis direction) and second preliminary electrode serials Rx' arranged in parallel in a second direction (for example, an Y-axis direction) crossing over the first direction are formed in the electrode forming part A of the substrate 100, and upper layers 122b and 124b are formed in the routing wire part B so as to cover the lower layers 122a and 124a of the first and second routing wires, and the upper layers 126b and 128b are formed in the pad part C so as to cover the lower layers 126a and 128a of the first and second pads.

Here, each of the first preliminary electrode serials Tx' comprises a plurality of first electrode pattern lower layers 131a separated from each other at a predetermined interval, and each of the second preliminary electrode serials Rx' comprises a plurality of second electrode pattern lower layers 132a and first connection patterns 133 for connecting neighboring second electrode pattern lower layers 132a. The second electrode pattern lower layers 132a are integrally formed with the first connection patterns 133.

Referring to FIGS. 11A and 11B, first insulation patterns 141 and a second insulation pattern 143 are formed on the substrate 100 on which the second conductive pattern group is formed by a photolithography process using a third mask.

More specifically, an insulation layer is formed on the entire surface of the substrate 100 on which the second conductive pattern group comprising the first and second preliminary electrode serials Tx' and Rx', the upper layers 122b and 124b of the first and second routing wires, and the upper layers 126b and 128b of the first and second pads is formed. Although the insulation layer is preferably made of an inorganic insulation material such as silicon nitride (SiNx), silicon oxide, it is possible to use an organic insulation material such as photo acryl or a hybrid material formed of a combination of an inorganic insulation material and an organic insulation material.

Next, a third photoresist pattern for exposing the insulation layer is formed by performing a photolithography process using a third mask. After removing the insulation layer exposed by the third photoresist pattern by dry etching, the first insulation patterns 141 and the second insulation pattern 143 are formed by removing the residual third photoresist pattern. The first insulation patterns 141 are formed in the electrode forming part A, and are formed so as to cover the first connection pattern 133 of the second preliminary electrode serials Rx'. The second insulation pattern 143 is formed in the routing wire part B and the pad part C, and formed so as to expose the first and second pad upper layers 126b and 128b. Although the insulation layer is made of silicon nitride (SiNx), silicon oxide (SiOx), or the like, it is possible for the insulation layer to be made of an organic insulation material such as photo acryl or a hybrid material formed of a combination of an inorganic insulation material and an organic insulation material.

Referring to FIGS. 12A and 12B, a third conductive pattern group comprising first and second electrode pattern upper layers 131b and 132b, second connection patterns 134, and uppermost layers 126c and 128c of the first and second pads is formed on the substrate 100.

More specifically, a third conductive layer is deposited on the entire surface of the substrate 100 on which the first and second insulation patterns 141a and 143 are formed by a deposition process such as a sputtering method. As the third conductive layer, a transparent conductive material, such as ITO, IZO, and GZO, is mainly used.

After a photoresist is coated on the entire substrate 10 on which the third conductive layer is formed, a fourth photoresist pattern for exposing the third conductive layer is formed by performing a photolithography process using a fourth mask. After removing the second conductive layer exposed by the second photoresist pattern through wet etching, first and second electrode pattern upper layers 131b and 132b are formed respectively on the first and second electrode pattern lower layers 131a and 132a, and uppermost layers 126c and 128c of the first and second pads are formed respectively on the upper layers 126b and 128b of the first and second pads exposed through the second insulation pattern 143. The upper layers 131b and 132b are formed in the first and second preliminary electrode serials Tx' and Rx' consisting only of the lower layers 131a and 132a and the first connection pattern 133, and second connection patterns 134 are formed on the first insulation pattern 141, thereby completing the first electrode line Tx and the second electrode line Rx. In the fourth mask process, the thickness t2 of the upper layer 131b of the first electrode pattern is greater than the thickness t1 of the first electrode pattern lower layer 131a, and the thickness t2 of the second electrode pattern upper layer 132b is greater than the thickness t1 of the second electrode pattern lower layer 132a.

Finally, each of the first electrode serials Tx comprises a plurality of first electrode patterns 131 each having a two-layered structure of a lower layer 131a and an upper layer 131b and a second connection pattern 134 for connecting the upper layers 131b of neighboring first electrode patterns, and the second connection pattern 134 is formed on the first insulation pattern 141. Also, the second connection patterns 134 are integrally formed with the first electrode pattern upper layers 131b.

Moreover, each of the second electrode serials Rx comprises a plurality of second electrode patterns 132 each having a two-layered structure of a lower layer 132a and an upper layer 132b and a first connection pattern 133 for connecting the lower layers 132a of neighboring second electrode patterns, and the second connection pattern 134 is formed under the first insulation pattern 141. Also, the first connection patterns 133 are integrally formed with the second electrode pattern lower layers 132a.

The second connection pattern 134 of the first electrode serials Tx and the first connection pattern 133 of the second electrode serials Rx cross over each other to sustain an electrical insulation state because they cross over each other with the first insulation pattern 141 interposed therebetween.

The first electrode pattern lower layers 131a of the first electrode serials Tx are formed in the second mask process for forming the second electrode pattern lower layers 132a of the second electrode serials Rx and the first connection pattern 133, and the first electrode pattern upper layers 131 and second connection pattern 134 of the first electrode serials Tx are formed in the fourth mask process for forming the second electrode pattern upper layers 132b of the second electrode serials Rx. That is, they are formed in two separate processes.

According to the electrostatic capacity type touch screen panel according to an exemplary embodiment of the present invention, the first electrode pattern lower layer 131a, second electrode pattern lower layer 132a, and first connection pattern 133 each having the thickness t1 are formed in the second mask process, and the first electrode pattern upper layer 131b, second electrode pattern upper layer 132b, and second connection pattern 134 each having the thickness t2 are formed in the fourth mask process. That is, the first electrode serials Tx and the second electrode serials Tx are formed in two separate mask processes.

When comparing the touch screen panel according to the related art and the touch screen panel according to an exemplary embodiment of the present invention, the related art first electrode pattern and second electrode pattern having the same thickness t1+t2 as the present invention are formed at once in the fourth mask process. Regarding this, in the present invention, the first electrode pattern lower layer 131a and the second electrode pattern lower layer 132a are formed with the thickness t1 in the second mask process, and the first electrode pattern upper layer 131b and the second electrode pattern upper layer 132b are formed with the thickness t2 in the fourth mask process. Accordingly, a deposition process and a patterning process are to be performed for the thickness t2, except for the thickness t1 of the first electrode pattern lower layers 131a and second electrode pattern lower layers 132a that have been already formed in the second mask process. Therefore, the deposition time and patterning time can be decreased as much as the thickness t1 in the fourth mask process. Hence, the electrostatic capacity type touch screen panel according to the exemplary embodiment of the present invention can obtain the effect of reducing the process time and forming an electrode pattern without leaving any residual film while using the process using the same number of masks as the related art.

The touch screen panels according to the embodiments of this invention may be applied to display devices such as a liquid crystal display LCD, a field emission display FED, a plasma display panel PDP, an electroluminescence device EL, an electrophoresis display, etc. In these cases, the substrates of the touch screen panels may be also used as substrates of the display devices Although example embodiments have been described with reference to a number of illustrative examples, it should be understood that numerous other modifications and changes can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch screen panel, comprising:
a substrate;
a plurality of first electrode serials arranged in a first direction on the substrate;
a plurality of second electrode serials arranged in a second direction to cross over the first electrode serials; and
a plurality of insulation patterns formed at each intersection of the plurality of first and second electrode serials and to electrically insulate the plurality of first and second electrode serials,
wherein each of the plurality of first electrode serials comprises a plurality of first electrode patterns and a plurality of second connection patterns for connecting neighboring the plurality of first electrode patterns,
wherein each of the plurality of second electrode serials comprises a plurality of second electrode patterns and a plurality of first connection patterns for connecting neighboring second electrode patterns,
wherein each of the plurality of first electrode patterns comprises a lower layer formed on the substrate and an upper layer formed on the lower layer,
wherein the plurality of second connection pattern connects neighboring the plurality of first electrode pattern upper layers,
wherein each of the plurality of second electrode serials is formed on the substrate,
wherein each of the plurality of second connection patterns is formed on the each of the plurality of insulation patterns, and
wherein the plurality of first electrode patterns are formed on the substrate.

2. The touch screen panel of claim 1, wherein:
each of the second electrode patterns comprises a lower layer formed on the substrate and an upper layer formed on the lower layer of the second electrode pattern; and
the first connection pattern connects neighboring second electrode pattern lower layers.

3. The touch screen panel of claim 2, wherein:
the first electrode pattern upper layers are integrally formed with the second connection patterns; and
the second electrode pattern lower layers are integrally formed with the first connection patterns.

4. The touch screen panel of claim 2, wherein:
the second connection patterns and the first connection patterns are formed to cross over each other with the insulation pattern interposed in between the two connection patterns;
the first connection pattern is formed under the insulation pattern; and the second connection pattern is formed on the insulation pattern.

5. The touch screen panel of claim 2, further comprising:
a plurality of first routing wires connected respectively to the plurality of first electrode serials; and
a plurality of second routing wires connected respectively to the plurality of second electrode serials,
wherein each of the first routing wires comprises a lower layer formed on the substrate and an upper layer formed on the lower layer of the first routing wire and connected to the lower layer of the first electrode pattern, and
wherein each of the second routing wires comprises a lower layer formed on the substrate and an upper layer formed on the lower layer of the second routing wire and connected to the lower layer of the first electrode pattern.

6. The touch screen panel of claim 5, further comprising:
a plurality of first pads connected respectively to the plurality of first routing wires; and
a plurality of second pads connected respectively to the plurality of second routing wires,
wherein each of the first pads comprises a first layer formed on the substrate and connected to the lower layer of the first routing wire, a second layer formed on the first layer and connected to the upper layer of the first routing wire, and a third layer formed on the second layer, and
wherein each of the second pads comprises a first layer formed on the substrate and connected to the lower layer of the second routing wire, a second layer formed on the first layer and connected to the upper layer of the second routing wire, and a third layer formed on the second layer of the second pad.

7. The touch screen panel of claim 6, wherein:
the first and second electrode serials, the upper layers of the first and second routing wires, the second layers of the first and second pads, and the third layers of the first and second pads are formed of a transparent conductive material; and
the lower layers of the first and second routing wires and the first layers of the first and second pads are made of any metal selected from Al, AlNd, Mo, MoTi, Cu, CuOx, and Cr.

8. The touch screen panel of claim 2, wherein:
the thickness of the upper layer of the first electrode pattern is greater than the thickness of the lower layer of the first electrode pattern; and
the thickness of the upper layer of the second electrode pattern is greater than the thickness of the lower layer of the second electrode pattern.

9. A method for manufacturing a touch screen panel, the method comprising:
preparing a substrate comprising an electrode forming area and a routing wire forming area positioned outside the electrode forming area;
forming a first conductive pattern group comprising lower layers of first routing wires and lower layers of second routing wires in the routing wire forming area;
forming a second conductive pattern group comprising lower layers of first electrode pattern groups, lower layers of second electrode patterns groups, and first connection patterns for connecting neighboring second electrode pattern lower layers in the electrode forming area of the substrate in which the first conductive pattern group is formed;
forming first insulation patterns on the first connection patterns of the electrode forming area;
forming a second insulation pattern in the lower layers of the first routing wires and the lower layers of the second routing wires;
forming first electrode pattern upper layers on the first electrode pattern lower layers;
forming second connection patterns on the first insulation patterns; and
forming second electrode pattern upper layers on the second electrode pattern lower layers,
wherein the lower layers of first electrode pattern groups, the lower layers of second electrode patterns groups, and the first connection patterns are formed on the substrate, and
wherein each of the second connection patterns connects neighboring the second electrode pattern upper layers.

10. The method of claim 9, wherein:
the forming of the first conductive pattern group comprises:
depositing a first conductive layer on the entire surface of the substrate;
forming a first photoresist pattern to expose the first conductive layer of the entire electrode forming area and the first conductive layer of some part of the routing wire forming area; and
forming the lower layers of the first routing wires and the lower layers of the second routing wires in the routing wire forming area by wet-etching the exposed first conductive layer and removing the first photoresist pattern; and
the forming of the second conductive pattern group comprises:
depositing a second conductive layer on the entire surface of the substrate in which the first conductive pattern group is formed;
forming a second photoresist pattern to expose the second conductive layer of some part of the electrode forming area of the substrate and the second conductive layer of some part of the routing wire forming area;
forming first preliminary electrode serials arranged in a first direction and second preliminary electrode serials arranged in a second direction crossing over the first direction in the electrode forming area by wet-etching the second conductive layer exposed by the second photoresist pattern and removing the second photoresist pattern; and
forming upper layers in the routing wire forming area to cover the lower layers of the first and second routing wires.

11. The method of claim 10, wherein:
each of the first preliminary electrode serials comprises a plurality of first electrode pattern lower layers separated from each other at a predetermined interval;
each of the second preliminary electrode serials comprises a plurality of second electrode pattern lower layers and first connection patterns for connecting neighboring second electrode pattern lower layers; and
the second electrode pattern lower layers are integrally formed with the first connection patterns.

12. The method of claim 10, wherein the forming of the first and second insulation patterns comprises:
forming an insulation layer on the substrate in which the second conductive pattern group is formed;
forming a third photoresist pattern to expose the insulation layer of some part of the electrode forming area of the substrate; and forming first insulation patterns formed on the first connection patterns of the electrode forming area and second insulation patterns on the first and second routing wires of the routing wire forming area by dry-etching the insulation layer exposed by the third photoresist pattern and removing the third photoresist pattern.

13. The method of claim 12, wherein the forming of the third conductive pattern group comprises:
   depositing a third conductive layer on the entire surface of the substrate in which the first and second insulation patterns are formed;
   forming a fourth photoresist pattern to expose part of the third conductive layer of the electrode forming area of the substrate;
   forming first and second electrode pattern upper layers, respectively, on the first and second electrode pattern lower layers by removing the third conductive layer exposed by the fourth photoresist pattern through wet etching and removing the fourth photoresist pattern; and
   forming second connection patterns on the first insulation patterns.

14. The method of claim 13, wherein:
   the second connection patterns connects neighboring first electrode patterns; and
   the first electrode pattern upper layers are integrally formed with the second connection patterns.

15. The method of claim 10, wherein:
   the first and second electrode serials and the upper layers of the first and second routing wires are formed of a transparent conductive material; and
   the lower layers of the first and second routing wires are formed of any metal selected from Al, AlNd, Mo, MoTi, Cu, CuOx, and Cr.

16. The method of claim 13, wherein:
   the thickness of the upper layer of the first electrode pattern is greater than the thickness of the lower layer of the first electrode pattern; and
   the thickness of the upper layer of the second electrode pattern is greater than the thickness of the lower layer of the second electrode pattern.

\* \* \* \* \*